United States Patent
Cho et al.

(10) Patent No.: US 7,676,155 B2
(45) Date of Patent: Mar. 9, 2010

(54) DYNAMIC WAVELENGTH ALLOCATION DEVICE USING 3R WAVELENGTH CONVERTER HAVING LIMITED WAVELENGTH CONVERSION RANGE AND METHOD THEREOF

(75) Inventors: Yun-Hee Cho, Daejeon (KR); Kwang-Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 553 days.

(21) Appl. No.: 11/633,170

(22) Filed: Dec. 4, 2006

(65) Prior Publication Data

US 2007/0133985 A1 Jun. 14, 2007

(30) Foreign Application Priority Data

Dec. 8, 2005 (KR) .................. 10-2005-0120089
Jun. 2, 2006 (KR) .................. 10-2006-0049733

(51) Int. Cl.
*H04J 14/00* (2006.01)
(52) U.S. Cl. .................................... 398/57
(58) Field of Classification Search ............ 398/57, 398/175
See application file for complete search history.

(56) References Cited

U.S. PATENT DOCUMENTS 6,792,207 B2 * 9/2004 Iannone et al. ............ 398/51

2002/0012143 A1 * 1/2002 Graves et al. ............ 359/128
2004/0052527 A1 * 3/2004 Kirby ...................... 398/57

FOREIGN PATENT DOCUMENTS

KR 10-2004-0025040 3/2004

OTHER PUBLICATIONS

Subramaniam, S., "All-Optical Networks with Sparse Wavelength Conversion." Aug. 1996. *IEEE/ACM Transactions on Networking*, vol. 4, No. 4, pp. 544-557.

* cited by examiner

*Primary Examiner*—Quan-Zhen Wang
(74) *Attorney, Agent, or Firm*—Ladas & Parry LLP (57) ABSTRACT

In a wavelength allocation method in a wavelength division multiplexing network, a 3R wavelength converter having a limited wavelength conversion range is disposed according to a wavelength conversion band of each node, at least one path set between transmitting/receiving nodes is selected, routing paths corresponding to the number of the selected at least one path set between the transmitting/receiving nodes having a request for a new optical path generation are extracted, it is determined whether there is a wavelength consecutive segment set that satisfies a maximum transmission distance for guaranteeing transmission quality of an optical signal and that includes one consecutive wavelength among the extracted routing paths, and a path using a first-fit wavelength is selected from paths of each wavelength consecutive segment and the wavelength is allocated when determining that there is a wavelength consecutive segment set.

9 Claims, 6 Drawing Sheets

| # out links | # Nodes | Total # 3R=WCs |
|---|---|---|
| 2 | 4 | 2W 3R-WC |
| 3 | 12 | 3W 3R-WC |
| 4 | 9 | 4W 3R-WC |

DYNAMIC WAVELENGTH ALLOCATION DEVICE USING 3R WAVELENGTH CONVERTER HAVING LIMITED WAVELENGTH CONVERSION RANGE AND METHOD THEREOF

CROSS-REFERENCE TO RELATED APPLICATION

This application claims priority to and the benefit of Korean Patent Application No. 10-2005-0120089 filed on Dec. 8, 2005, and No. 10-2006-0049733 filed on Jun. 2, 2006, in the Korean Intellectual Property Office, the entire contents of which are incorporated herein by reference.

BACKGROUND OF THE INVENTION (a) Field of the Invention

The present invention relates to a wavelength allocation method and a wavelength allocation device, and particularly relates to a wavelength allocation device using a 3R wavelength converter having a limited wavelength conversion range and a wavelength allocation method thereof.

(b) Description of the Related Art

In the high speed optical communication field, a wavelength division multiplexing (WDM) method using optical channels is used to transmit a large amount of data through a single optical fiber.

It is predicted that an optical communication network will be developed from a linear or circular network using a fixed line to an all-transmission network in which a network is dynamically configured by changing an optical channel path.

Particularly, a backbone network will become a mesh-type network based on an optical cross connector (OXC) for reconfiguring lines of each node.

In the mesh type of network in the WDM method, it is required to satisfy a wavelength consecutive condition in which wavelengths of an input channel and an output channel are the same.

A wavelength converter is used to satisfy the wavelength consecutive condition, and research results have been published showing that network efficiency is greatly improved by using a lesser number of wavelength converters compared to the number of optical channels for each node.

However, in the mesh type network in the WDM method, since there is a limit in transmission distance due to quality deterioration caused while an optical signal is transmitted, it is required to consider the wavelength consecutive condition and the quality deterioration of the optical signal.

When an optical signal path is set to be a path that is greater than a signal impairment threshold (SIT), which is a maximum distance for guaranteeing transmission quality, it is required to perform three R functions including Re-amplification, Re-shaping, and Re-timing (hereinafter, referred to as "3R regeneration") for the optical signal.

In a dynamic WDM network, it is required to fully accept requests for optical path generation, and therefore it is important to not waste resources more than needed when an individual optical path is set.

A 3R wavelength converter performs the 3R function, and converts a predetermined wavelength channel to another wavelength channel. Sine the 3R wavelength converter is expensive, it may not be formed for all the wavelength channels at each node.

Accordingly, in the WDM network, the 3R wavelength converting function is provided to a predetermined node, or the number of 3R wavelength converters is limited, and this will be referred to as a limited wavelength converting function.

It may be wasteful to provide a 3R wavelength converter for performing full wavelength conversion in the WDM network, since the number of wavelengths applied to one link is rapidly increased.

A conventional WDM network having the limited wavelength conversion function sets an assumption of a wavelength conversion condition for performing the wavelength converting function for all the wavelength channels at a predetermined node, or sets an assumption of a wavelength conversion condition performing the limited wavelength converting function at all the nodes.

That is, the limited wavelength conversion condition has been studied only in relation to the wavelength converter. In addition, it has been studied assuming that each wavelength converter may perform the full wavelength conversion.

However, since a maximum transmission distance of the optical signal is limited in the actual WDM network, it is required to consider the wavelength conversion function and the 3R functions.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for disposing a 3R wavelength converter having a limited wavelength conversion range, a wavelength allocation device according to a wavelength conversion band, and a wavelength allocation method.

In an exemplary wavelength allocation method in a wavelength division multiplexing network according to an embodiment of the present invention, a) a 3R (Re-amplification, Re-shaping, and Re-timing) wavelength converter having a limited wavelength conversion range is disposed according to a wavelength conversion band of each node, b) at least one path set between transmitting/receiving nodes is selected, and routing paths corresponding to the number of the at least one selected path set between the transmitting/receiving nodes having a request for a new optical path generation are extracted, c) it is determined whether there is a wavelength consecutive segment set that satisfies a maximum transmission distance for guaranteeing transmission quality of an optical signal and includes one consecutive wavelength among the extracted routing paths, and d) when determining in c) that there is the wavelength consecutive segment set, a path using a first-fit wavelength is selected among paths of each wavelength consecutive segment, and wavelength allocation is performed.

An exemplary wavelength allocation device in a wavelength division multiplexing network according to an embodiment of the present invention includes a wavelength conversion band disposing unit, a path arranging unit, a routing path unit, a wavelength consecutive segment detection unit, and a wavelength allocation unit. The wavelength conversion band disposing unit disposes a 3R wavelength converter having a limited wavelength conversion range according to a wavelength conversion band of each node. The path arranging unit selects at least one path set between transmitting/receiving nodes, and arranges the at least one selected path set in order from the shortest path. The routing path unit extracts routing paths corresponding to the number of the at least one selected path set between the transmitting/receiving nodes having a request for a new optical path generation. The wavelength consecutive segment detection unit determines whether there is a wavelength consecutive segment set that satisfies a maximum transmission distance for guaranteeing transmission quality of an optical signal and that includes consecutive wavelengths among the routing paths extracted from the routing path unit. The wavelength allocation unit selects a path using a first-fit wavelength from among the path sets selected by the path set selection unit, and performs wavelength allocation.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprise", and variations such as "comprises" or "comprising", will be understood to imply the inclusion of stated elements but not the exclusion of any other elements.

A wavelength allocation device using a 3R (Re-amplification, Re-shaping, and Re-timing) wavelength converter having a limited wavelength conversion range, and a wavelength allocation method according to an exemplary embodiment of the present invention will now be described with reference to the figures.

Figure 1:
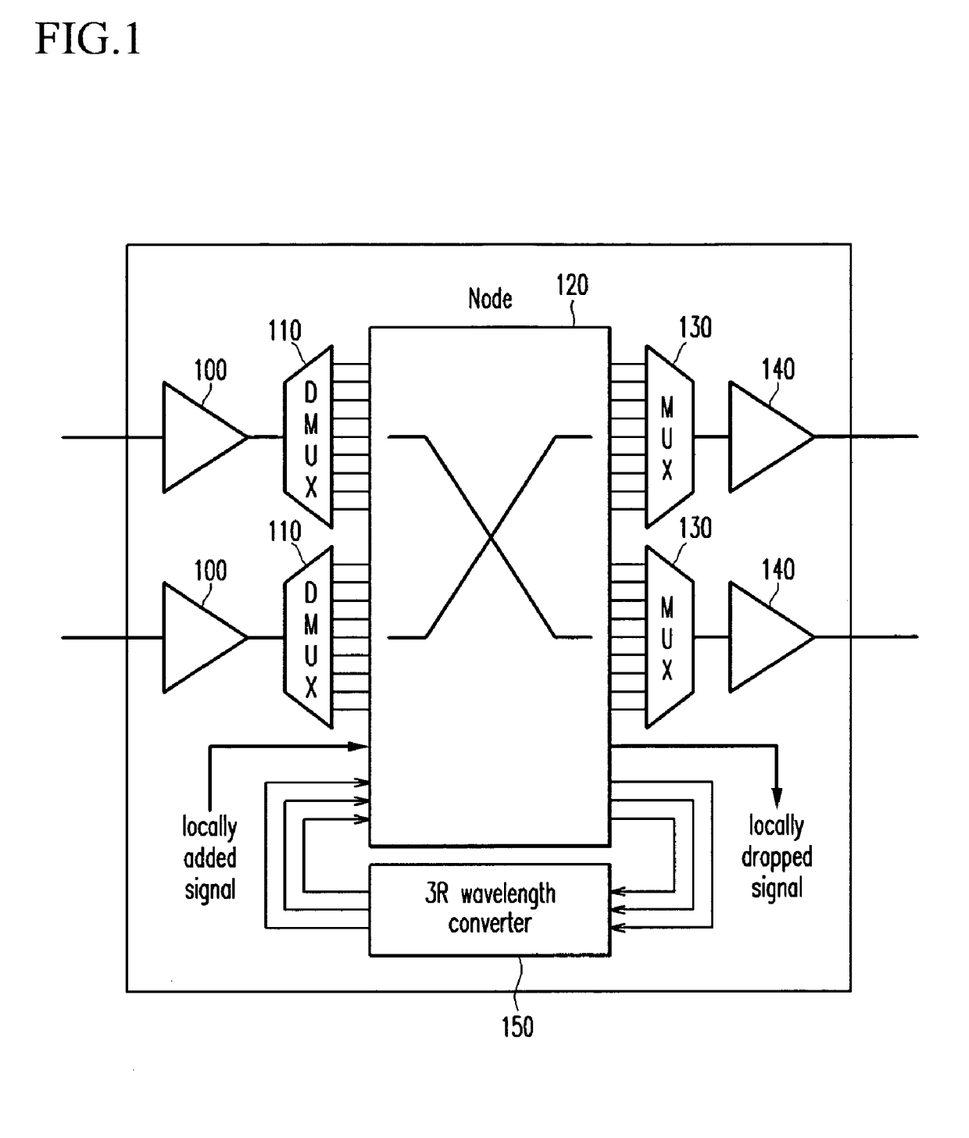
FIG. 1 shows a block diagram of a node configuration of a wavelength division multiplexing network according to an exemplary embodiment of the present invention.

FIG. 1 shows a block diagram of a node configuration of a wavelength division multiplexing network according to the exemplary embodiment of the present invention.

Each node includes an optical line division device, and performs an Add operation for adding a signal channel and a Drop operation for dropping a signal channel.

The node configuration according to the exemplary embodiment of the present invention includes a first optical power amplifier 100, a wavelength division demultiplexer 110, an optical space switch 120, a wavelength division multiplexer 130, a second optical power amplifier 140, and a 3R wavelength converter 150.

The first optical power amplifier 100 amplifies an optical signal received through input optical fiber, and transmits the signal to the wavelength division demultiplexer 110.

The wavelength division demultiplexer 110 separates signal channels corresponding to the respective wavelengths from the optical signal formed by multiplexing 1 to N wavelengths, and outputs the separated signal channels to the optical space switch 120.

The optical space switch 120 changes a connection state of the signal channels input from the wavelength division demultiplexer 110, and outputs it to the 3R wavelength converter 150 and the wavelength division multiplexer 130, or locally drops it.

The wavelength division multiplexer 130 multiplexes the transmission channels input from the optical space switch 120, and transmits them to the second optical power amplifier 140.

The second optical power amplifier 140 amplifies the optical signal that is output from the wavelength division multiplexer 130.

All the 3R wavelength converters 150 are shared by the node, and the number of 3R wavelength converters 150 may be between 0 and the number of wavelengths.

The 3R wavelength converter 150 simultaneously performs 3R regeneration functions and wavelength conversion functions to electrically regenerate a signal in an optical electricity optical (O/E/O) method, in which the wavelength conversion range is limited (i.e., a limited wavelength conversion range).

A wavelength allocation device for minimizing a wavelength conversion function in the WDM network will be described with reference to FIG. 2.

Figure 2:
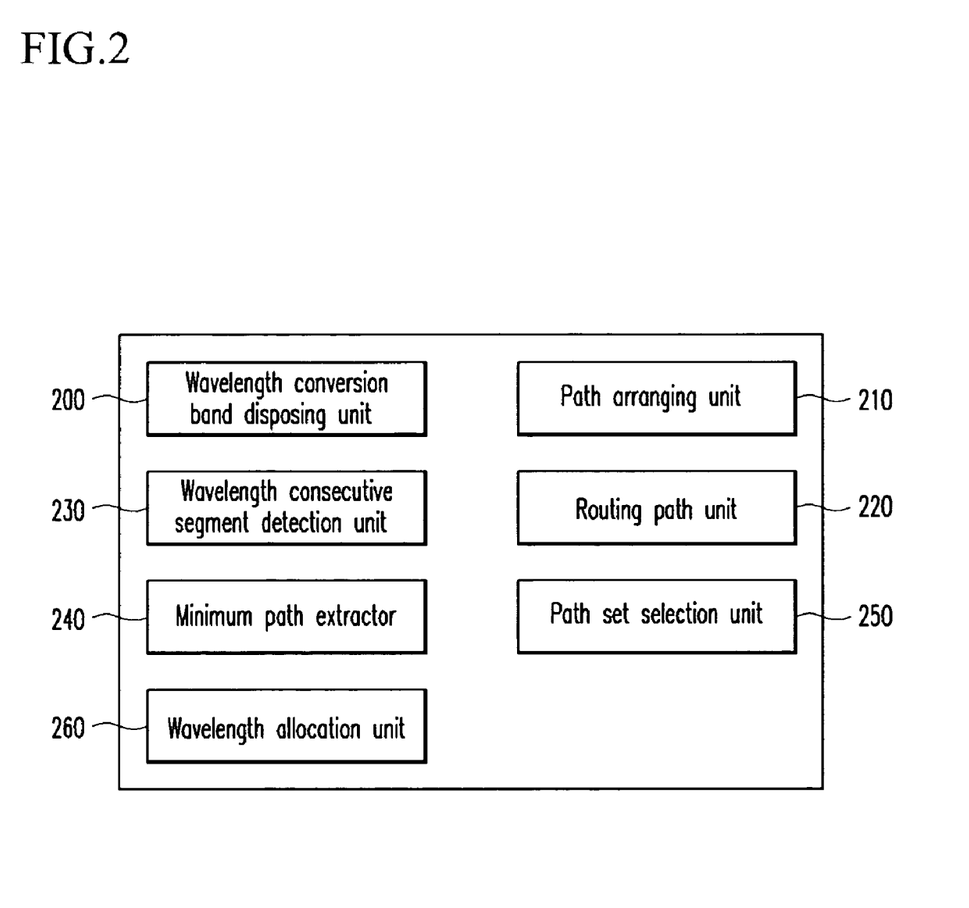
FIG. 2 shows a diagram of an internal configuration of the wavelength allocation device using a 3R wavelength converter having a limited wavelength conversion range according to the exemplary embodiment of the present invention.

FIG. 2 shows a diagram of an internal configuration of the wavelength allocation device using the 3R wavelength converter 150 having the limited wavelength conversion range according to the exemplary embodiment of the present invention.

The wavelength allocation device according to the exemplary embodiment of the present invention includes a wavelength conversion band disposing unit 200, a path arranging unit 210, a routing path unit 220, a wavelength consecutive segment detection unit 230, a minimum path extractor 240, a path set selection unit 250, and a wavelength allocation unit 260. Here, the wavelength allocation unit is one of constituent elements in a base station.

The wavelength conversion band disposing unit 200 disposes the 3R wavelength converter 150 having the limited wavelength conversion range according to a wavelength conversion band of each node.

The path arranging unit 210 selects K sets of paths between all the transmitting/receiving nodes, and arranges the selected K sets in order from the shortest path.

The routing path unit 220 determines whether a request for a new optical path generation is transmitted, and extracts K predetermined routing paths between the transmitting/receiving nodes having the request for a new optical path generation.

The wavelength consecutive segment detection unit 230 determines whether there is a single path that satisfies a maximum transmission distance for guaranteeing transmission quality of the optical signal and that includes consecutive wavelengths among the routing paths extracted from the routing path unit 220.

The wavelength consecutive segment detection unit 230 determines whether there is a wavelength consecutive segment set that satisfies a maximum transmission distance for guaranteeing transmission quality of the optical signal and includes consecutive wavelengths among the routing paths extracted from the routing path unit 210.

When receiving a signal indicating that there is no single path as above from the wavelength consecutive segment detection unit 230, the minimum path extractor 240 extracts a path using a minimum number of the 3R functions or the wavelength conversion functions from among the K routing paths. In addition the minimum path extractor 240 extracts location information of the 3R wavelength converter 150 and information on the number of the remaining 3R wavelength converters 150 for each extracted path.

The path set selection unit 250 determines whether there is a set of paths including a minimum number of wavelength consecutive segments among the paths extracted from the minimum path extractor 240. In this case, when determining that there is a plurality of path sets, the path set selection unit 250 selects a path set in order from a shortest path from among the path sets. In addition, the path set selection unit 250 selects a set of paths having the most remaining 3R wavelength converters 150 for connecting the wavelength consecutive segments.

The wavelength allocation unit 260 selects a path using a first-fit wavelength from among the path sets selected by the path set selection unit 250 and performs a wavelength allocation.

In addition, when receiving a signal indicating that there is the single path from the wavelength consecutive segment detection unit 230, the wavelength allocation unit 260 selects a path using a first-fit wavelength among the single path and performs the wavelength allocation.

The wavelength allocation unit 250 selects the path using the first-fit wavelength on a path of each wavelength consecutive segment from among the wavelength consecutive segment sets, and allocates the wavelength.

A wavelength allocation method using the wavelength allocation device using the 3R wavelength converter 150 having the limited wavelength conversion range will now be described with reference to FIG. 3.

Figure 3:
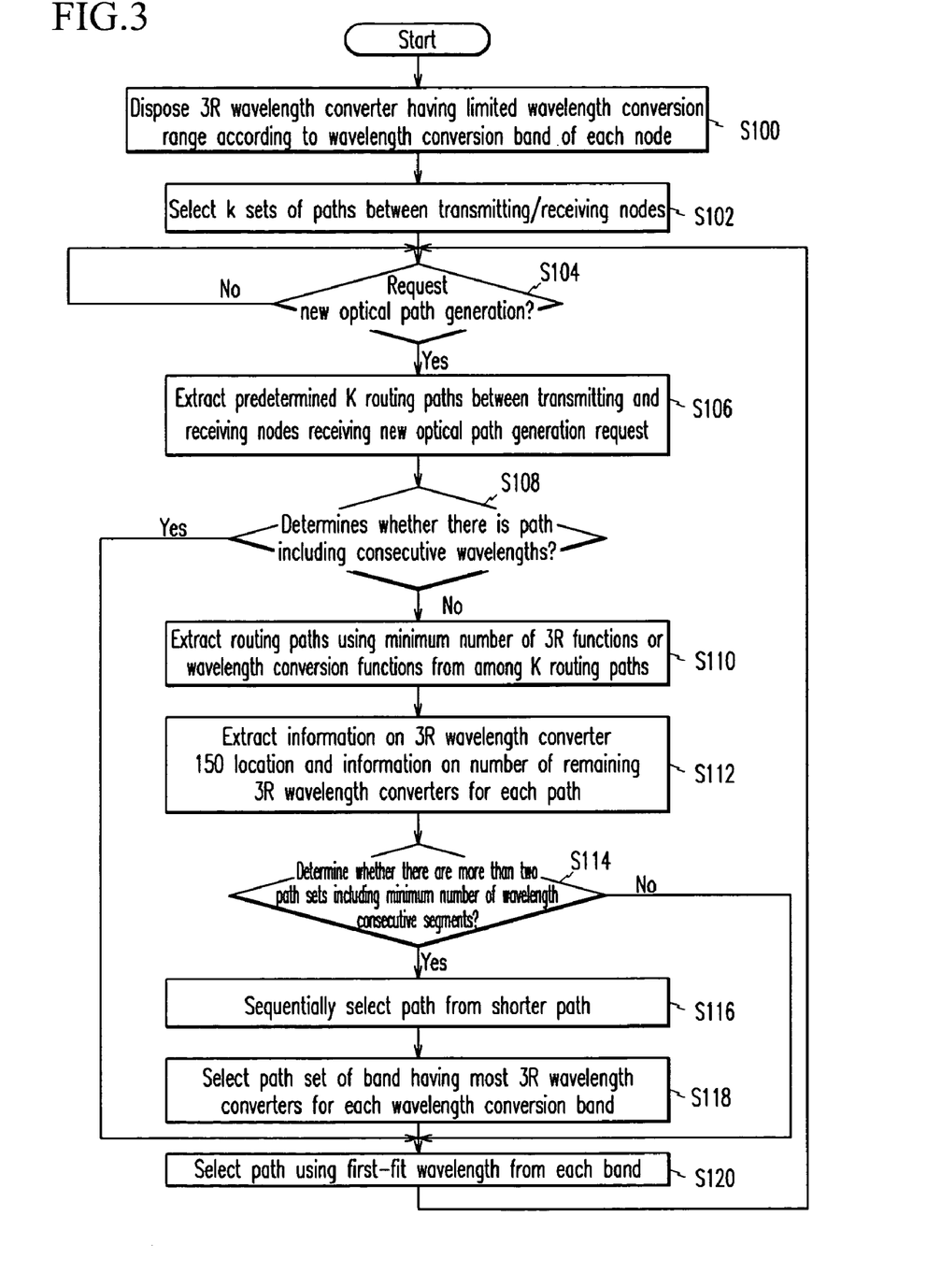
FIG. 3 shows a flowchart representing a wavelength allocation method according to the exemplary embodiment of the present invention.

FIG. 3 shows a flowchart representing the wavelength allocation method according to the exemplary embodiment of the present invention.

Since the 3R wavelength converter 150 according to the exemplary embodiment of the present invention has the limited wavelength conversion range, the wavelength conversion band is generated according to the limited wavelength conversion range.

The wavelength conversion band disposing unit 200 disposes the 3R wavelength converter 150 having the limited wavelength conversion range according to the wavelength conversion band of each node in step S100. Accordingly, the wavelength allocation method according to the exemplary embodiment of the present invention is performed according to each wavelength conversion band.

A method for disposing the 3R wavelength converter 150 is given as Equation 1.

$$B_{WC} = W/T_{3R\text{-}WC}$$ [Equation 1]

Here, $T_{3R\text{-}WC}$ denotes the number of convertible wavelengths of the 3R wavelength converter 150, and W denotes the number of wavelengths for each link. $B_{WC}$ denotes a value obtained by dividing the number of wavelengths for each link by the number of convertible wavelengths of the 3R wavelength converter 150.

For example, when W is 64 and $T_{3R\text{-}WC}$ is 8, $B_{WC}$ is 8. A total of the wavelengths is 64, and it is required to provide 8 bands ($B_{WC}$) to support all the wavelengths by using the 3R wavelength converter 150 for converting the wavelength only in 8 channels. Accordingly, 1 to $B_{WC}$ bands are provided in the wavelength conversion bands.

The wavelength conversion band disposing unit 200 according to the exemplary embodiment of the present invention sequentially disposes $N_{3R\text{-}WC}$ 3R wavelength converters 150 to bands 1 to $B_{WC}$.

Here, $N_{3R\text{-}WC}$ denotes the number of 3R wavelength converters 150 for each node. In this case, a band among the bands 1 to $B_{WC}$ includes more 3R wavelength converters 150.

For example, when W is 64 and $T_{3R\text{-}WC}$ is 8, the W (=64) channels are divided by the 8 ($B_{WC}$=W/$T_{3R\text{-}WC}$=8) bands, and the 3R wavelength converter 150 is sequentially disposed to the band 1. In this case, a previous band may include more 3R wavelength converters 150.

That is, when $N_{3R\text{-}WC}$ is 20, the bands 1 to 4 respectively include three 3R wavelength converters 150, and the bands 5 to 8 include two wavelength converters 150.

The three 3R wavelength converters 150 of the band 1 may perform the wavelength conversion from λ1 to λ8, and the two 3R wavelength converters 150 of the band 8 may perform the wavelength conversion from λ57 to λ64.

The path arranging unit 210 uses a Dijkstra's shortest path algorithm to select K sets of paths between all the transmitting/receiving nodes, and arranges the K selected sets in an order from the shortest path in step S102.

The routing path unit 220 periodically determines in step S104 whether a new optical path generation request signal is received. When receiving the new optical path generation request signal, the routing path unit 220 extracts predetermined K routing paths between the transmitting and receiving nodes receiving the new optical path generation request signal, in step S106. That is, when receiving the new optical path generation request signal, the wavelength allocation device performs the steps S106 to S120.

The wavelength consecutive segment detection unit 230 determines in step S108 whether there is a path (a path having no need to perform the 3R function and the wavelength conversion function) that satisfies a maximum transmission distance and includes consecutive wavelengths among the K routing paths.

When determining in step S108 that there is a path satisfying the maximum transmission distance and that includes the wavelength consecutive segment, the wavelength allocation unit 260 selects a path using the first-fit wavelength among the path, and performs the wavelength allocation in step S120.

In this case, the wavelength selected by the wavelength allocation unit 260 to be used on the path is given as Equation 2.

For(w=0; w<$T_{3R\text{-}WC}$; w++)

For(band_id=0; band_id<$B_{3R\text{-}WC}$; band_id++)

State_w[band_id*$B_{3R\text{-}WC}$+w] [Equation 2]

Here, W denotes a wavelength index in a band, band_id denotes an index indicating each band, and State_w[ ] denotes an arrangement of each wavelength.

When a total wavelength to be used is 64 (W=64) and the wavelength conversion range is 8 ($T_{3R\text{-}WC}$=8), the wavelength index is 1 to 64.

Accordingly, the wavelength converter of the band 1 may convert the wavelengths of wavelength indexes 1 to 8, and the wavelength converter of the band 2 may convert the wavelengths of wavelength indexes 9 to 16. In a like manner, the wavelength converter of the band 8 may convert the wavelengths of wavelength indexes 57 to 64.

The 3R wavelength converter 150 is uniformly disposed for each band, and it is required to uniformly use the wavelength for each band so as to efficiently use the wavelength converter.

The wavelength allocation unit 260 determines whether a shortest wavelength of a first band is available to evenly use the wavelength for each band. When the shortest wavelength of the first band may not be used, the wavelength allocation unit 260 determines whether a shortest wavelength of a subsequent band may be used.

In this case, the shortest wavelength index of the first band is 1, and the shortest wavelength index of the second band is 9. That is, it is determined whether the wavelength is available, in an order of the index 1 wavelength, the index 9 wavelength, and the index 17 wavelength.

When determining in step S108 that there is no path that satisfies the maximum transmission distance and that includes the consecutive wavelengths, the minimum path extractor 240 extracts routing paths using a minimum number of the 3R functions or the wavelength conversion functions from among the K routing paths, in step S110.

The minimum path extractor 240 extracts, in step S112, information on a 3R wavelength converter 150 location (i.e., which node the 3R wavelength converter 150 is located on) and information on the number of the remaining 3R wavelength converters 150 for each path extracted in step S110.

Subsequently, the path set selection unit 250 determines in step S114 whether there are more than two path sets including a minimum number of wavelength consecutive segments through the steps S110 and S112. In addition, the path set selection unit 250 sequentially selects a path from a shorter path among the path sets in step S116 when determining that there are more than two path sets in step S114.

The path set selection unit 250 selects a path set of a band having the most 3R wavelength converters 150 for each wavelength conversion band in step S118 (i.e., the path set for uniformly forming the distribution of the available 3R wavelength converters 150).

The wavelength allocation unit 260 selects a path using a first-fit wavelength from each band, and allocates a wavelength to the selected path in step S120.

When the path set selection unit 250 determines in step S114 that there is one path set, the wavelength allocation unit selects the path using the first-fit wavelength from each band, and allocates the wavelength to the selected path in step S120.

As described with reference to FIG. 3, the following are considered in a path set and wavelength allocation method according to the exemplary embodiment of the present invention.

1. K routing paths between transmitting and receiving nodes.

2. A loss of optical path (i.e., the wavelength division multiplexing network has a limited maximum transmission distance.)

3. The limited number of 3R wavelength converters 150.

4. The 3R wavelength converter 150 having a wavelength conversion function of the limited range.

5. A path is set and a wavelength is allocated by using the minimum number of 3R wavelength converters 150.

In the wavelength allocation method for minimizing the 3R wavelength converting function according to the exemplary embodiment of the present invention, the maximum transmission distance guaranteeing the transmission quality of the optical signal is limited, it is required to generate the optical signal by using the 3R wavelength converter 150 when the optical signal exceeds the maximum transmission distance, and the optical signal is blocked when it is not regenerated.

In addition, since the 3R wavelength converter 150 having the limited wavelength conversion range is considered in the wavelength allocation method according to the exemplary embodiment of the present invention, a connection is blocked when the 3R wavelength converter 150 on the path is not in the remaining wavelength band.

The respective 3R wavelength converters 150 may be used in each band.

When idle wavelength channels are sequentially provided on a routing path, it is called the wavelength consecutive segment.

The most ideal optical path is formed when the transmitting and receiving nodes include one wavelength consecutive segment and when a distance between the transmitting and receiving nodes is less than the maximum transmission distance provided in the WDM network. In this case, since a corresponding optical path may be formed by one consecutive wavelength channel, there is no need to use the wavelength converter.

When the transmitting and receiving nodes are not connected by one wavelength consecutive segment, the optical path uses the 3R wavelength converter 150 to proceed from a predetermined wavelength consecutive segment to another wavelength consecutive segment.

Figure 4:
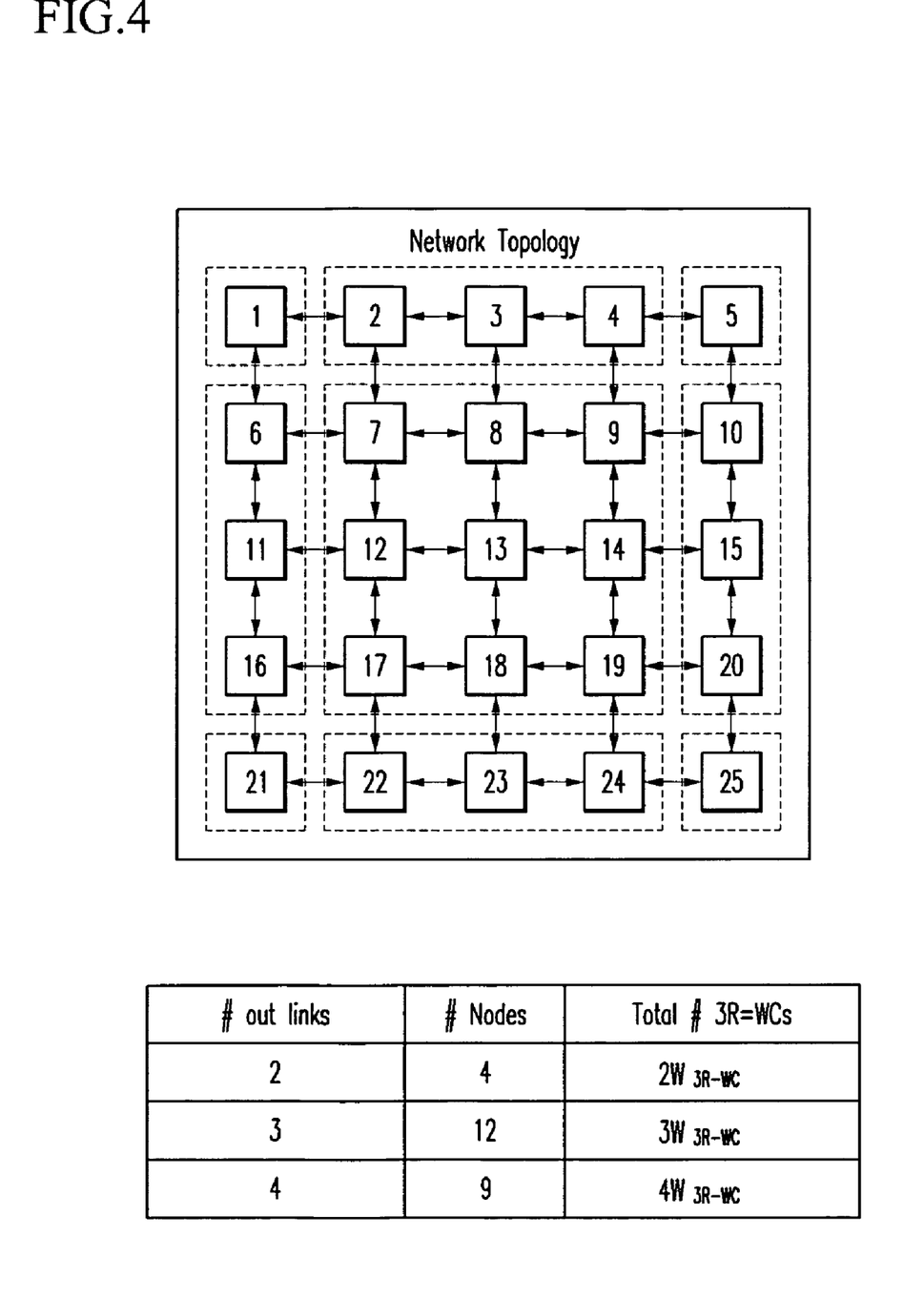
FIG. 4 shows a diagram representing a 5×5 mesh network topology according to the exemplary embodiment of the present invention.

FIG. 4 shows a diagram representing a 5×5 mesh network topology according to the exemplary embodiment of the present invention.

In the network topology, a ratio of the 3R wavelength converter 150 for each node varies according the number of outlinks.

The network topology includes $\sqrt{N} \times \sqrt{N} = N$ nodes (N=25) and $4\sqrt{N}(\sqrt{N}-1)$ fiber-links. Here, N denotes the number of nodes. Accordingly, the network topology has $N^C 2$ connection requests.

A total of the 3R wavelength converters 150 disposed to the node is in proposition to the number of outlinks of each node.

As shown in FIG. 4, the respective nodes may have 2, 3, or 4 outlinks in the network topology. The numbers of the 3R wavelength converters 150 of the respective nodes are $2W_{3R-WC}$, $3W_{3R-WC}$, and $4W_{3R-WC}$.

Since nodes 1, 5, 21, and 25 have two outlinks, the two wavelength converters are formed.

Figure 5:
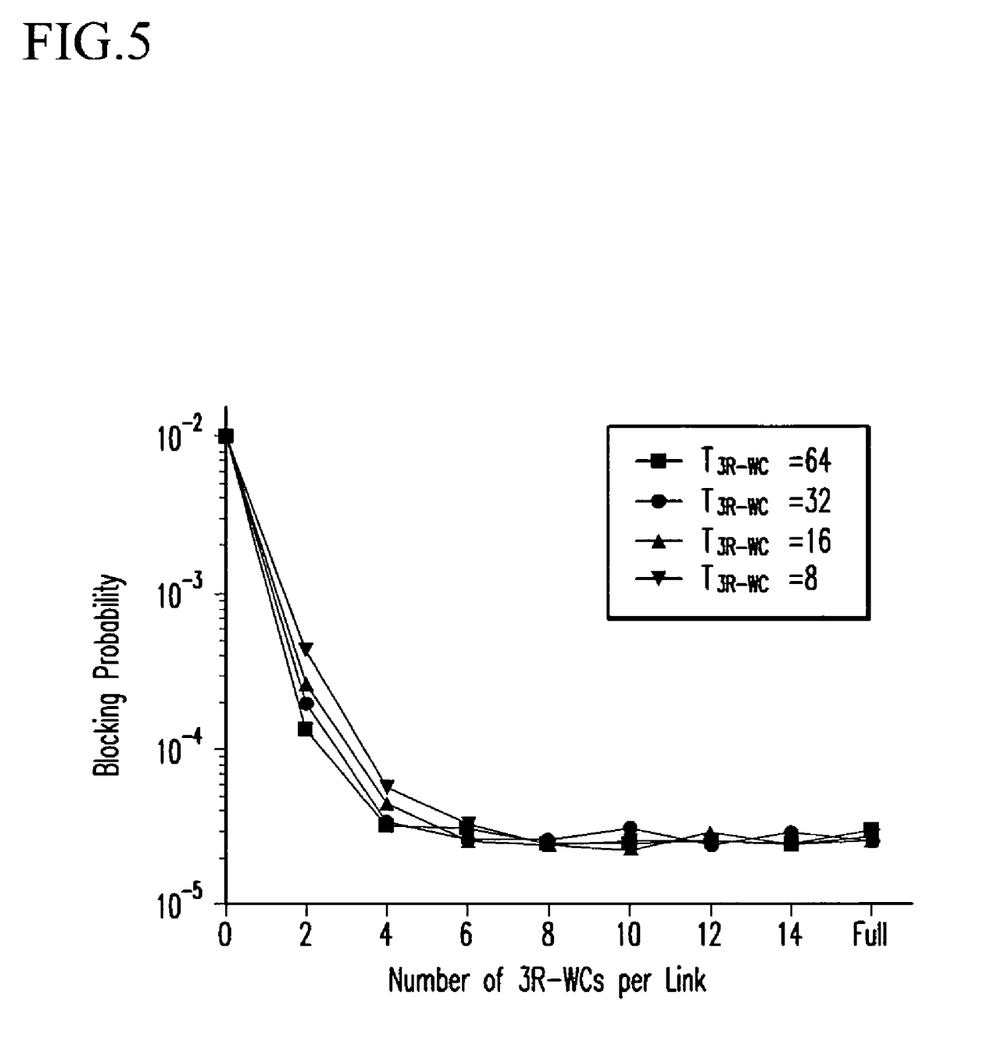
FIG. 5 shows a blocking probability according to variations of $W_{3R\text{-}WC}$ and $T_{3R\text{-}WC}$ when traffic load is 0.65 and a maximum transmission distance is 8.
Figure 6:
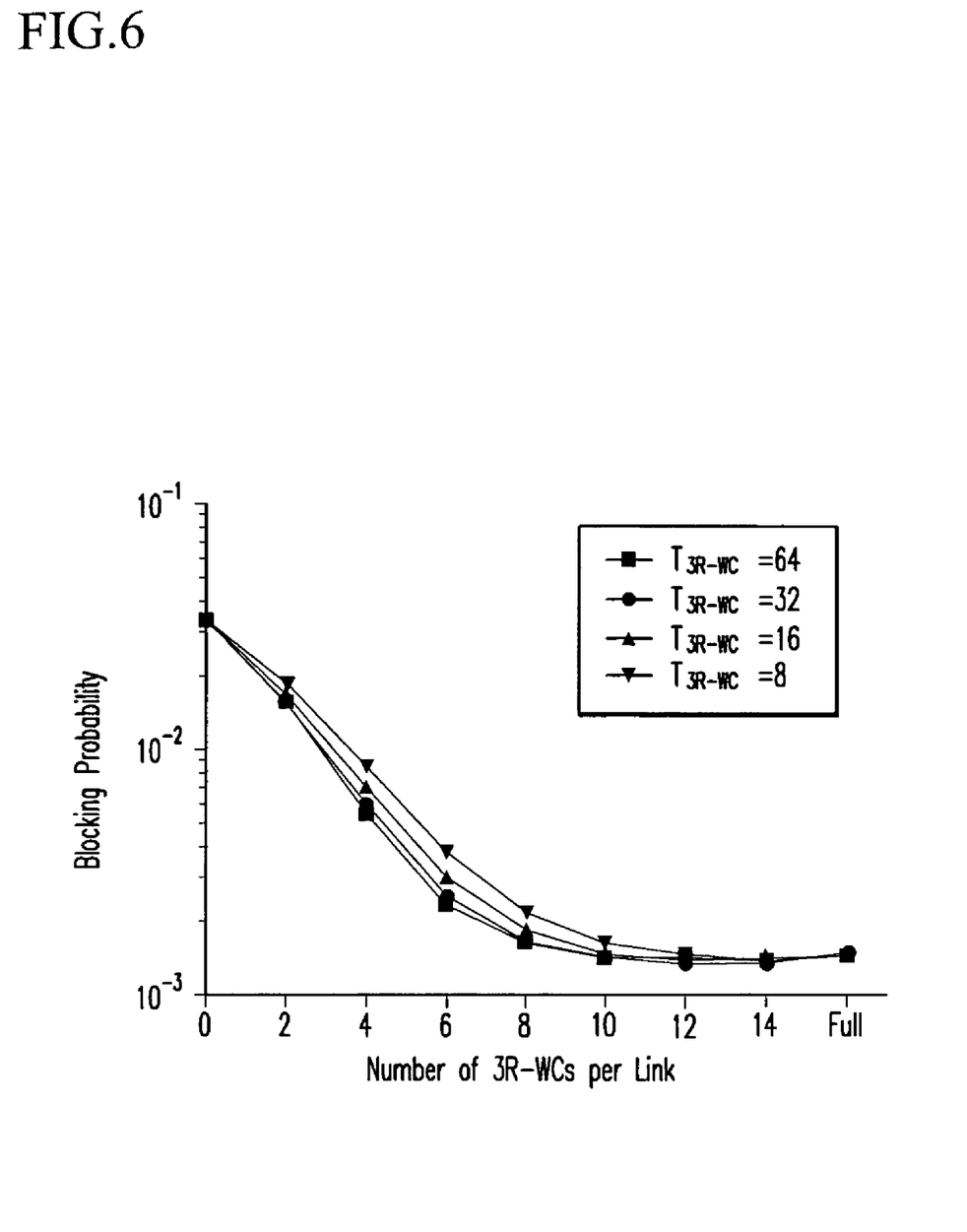
FIG. 6 shows the blocking probability according to the variations of $W_{3R\text{-}WC}$ and $T_{3R\text{-}WC}$ when the traffic load is 0.7 and the maximum transmission distance is 8.

FIG. 5 and FIG. 6 show graphs of a simulation result of the network topology having different traffic loads according to the exemplary embodiment of the present invention.

FIG. 5 shows a blocking probability according to variations of $W_{3R-WC}$ and $T_{3R-WC}$ when the traffic load is 0.65 and a maximum transmission distance is 8.

FIG. 6 shows the blocking probability according to the variations of $W_{3R-WC}$ and $T_{3R-WC}$ when the traffic load is 0.7 and the maximum transmission distance is 8.

The blocking probability is analyzed while the number of wavelength converters for each link varies in FIG. 5 and FIG. 6, a low price wavelength converter having the wavelength conversion range of 8 wavelengths is used when $T_{3R-WC}=8$, and a high price wavelength converter for performing a full wavelength conversion is used when $T_{3R-WC}=64$.

As shown in FIG. 5 and FIG. 6, when the wavelength converter having the limited wavelength conversion range after disposing the 3R wavelength converter in a disposing method according to the exemplary embodiment of the present invention is disposed, the same result as that of the full wavelength conversion may be obtained.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, since a method for disposing the 3R wavelength converter and a wavelength allocation method for minimizing the use of the 3R wavelength converter are used, the same performance as the wavelength division multiplexing network having an unlimited maximum transmission distance and the 3R wavelength converters in all channels of each node is obtained.

Since a new optical path is set such that the 3R wavelength converting function is minimized, the high cost 3R wavelength converter is not unnecessarily used, and network operational efficiency may be increased.

In addition, service disruption caused by wavelength collision may be reduced according to the exemplary embodiment of the present invention.

What is claimed is:

1. A wavelength allocation method in a wavelength division multiplexing network, the wavelength allocation method comprising:
   a) disposing a 3R (Re-amplification, Re-shaping, and Re-timing) wavelength converter having a limited wavelength conversion range according to a wavelength conversion band of each node;
   b) selecting at least one path set between transmitting/receiving nodes, and extracting routing paths corresponding to the number of the at least one selected path set between the transmitting/receiving nodes having a request for a new optical path generation;
   c) determining whether there is a wavelength consecutive segment set that satisfies a maximum transmission distance for guaranteeing transmission quality of an optical signal and that includes one consecutive wavelength among the extracted routing paths;
   d) when determining in c) that there is the wavelength consecutive segment set, selecting a path using a first-fit wavelength among paths of each wavelength consecutive segment, and performing wavelength allocation;
   e) extracting a minimum path using a minimum number of regeneration functions or wavelength conversion functions among the routing paths extracted in c);
   f) extracting information on a location of a 3R (Re-amplification, Re-shaping, and Re-timing) wavelength converter for performing the regeneration function and the wavelength conversion function and information on the number of remaining 3R wavelength converters from the extracted minimum path, and selecting a minimum path set having a minimum number of wavelength consecutive segments;
   g) determining whether at least two minimum path sets are selected;
   h) when the at least two minimum path sets are selected, selecting the selected minimum path sets in order from the shortest path; and
   i) selecting a path set having the most number of 3R wavelength converters among the selected minimum path sets.

2. The wavelength allocation method of claim 1, wherein the at least one path set selected in b) is arranged in order from the shortest path.

3. The wavelength allocation method of claim 1, further comprising, when the number of selected minimum path sets is not more than 2, selecting a path using the first-fit wavelength, and performing the wavelength allocation.

4. The wavelength allocation method of claim 1, wherein the 3R wavelength converter is sequentially disposed to bands 1 to $B_{WC}$ for each node;
   here, $B_{WC}$ denotes the number of wavelength conversion bands and
   $B_{WC}=W/T_{3R\text{-}WC}$ (a value obtained by dividing the number of wavelengths for each link by the number of convertible wavelengths of the 3R wavelength converter).

5. The wavelength allocation method of claim 1, wherein an optical path connection is blocked when the 3R wavelength converter on the path is not in the remaining wavelength conversion band.

6. A wavelength allocation device in a wavelength division multiplexing network, the wavelength allocation device comprising:
   a wavelength conversion band disposing unit for disposing a 3R (Re-amplification, Re-shaping, and Re-timing) wavelength converter having a limited wavelength conversion range according to a wavelength conversion band of each node;
   a path arranging unit for selecting at least one path set between transmitting/receiving nodes, and arranging the at least one selected path set in order from the shortest path;
   a routing path unit for extracting routing paths corresponding to the number of the at least one selected path set between the transmitting/receiving nodes having a request for a new optical path generation;
   a wavelength consecutive segment detection unit for determining whether there is a wavelength consecutive segment set that satisfies a maximum transmission distance for guaranteeing transmission quality of an optical signal and that includes consecutive wavelengths among the routing paths extracted from the routing path unit; and
   a wavelength allocation unit for selecting a path using a first-fit wavelength from among the path sets selected by the path set selection unit, and performing wavelength allocation.

7. The wavelength allocation device of claim 6, wherein the routing function is selected by considering a regeneration function or the regeneration function and a wavelength conversion function.

8. The wavelength allocation device of claim 6, further comprising a minimum path extractor for extracting a minimum path using a minimum number of the regeneration functions or the wavelength conversion functions from among the extracted routing paths, and extracting location information of a 3R (Re-amplification, Re-shaping, and Re-timing) wavelength converter and information on the number of remaining 3R wavelength converters.

9. The wavelength allocation device of claim 8, further comprising a path set selection unit for selecting path sets having a minimum number of wavelength consecutive segments among the paths extracted from the minimum path extractor, and selecting a path set from among the selected path sets in order from the shortest path and in order of the greatest number of 3R wavelength converters.

* * * * *